(12) United States Patent
Hagihara et al.

(10) Patent No.: US 6,363,098 B1
(45) Date of Patent: Mar. 26, 2002

(54) CARBON ELECTRODE FOR MELTING QUARTZ GLASS AND METHOD OF FABRICATING THEREOF

(75) Inventors: Hirotaka Hagihara; Takakazu Mori; Atsuro Miyao; Kiyoaki Misu; Shinya Wagatsuma; Shunichi Suzuki, all of Yamagata (JP)

(73) Assignee: Toshiba Ceramics Co., Ltd., Tokyo (JP)

( * ) Notice: Subject to any disclaimer, the term of this patent is extended or adjusted under 35 U.S.C. 154(b) by 0 days.

(21) Appl. No.: 09/672,982

(22) Filed: Sep. 29, 2000

(30) Foreign Application Priority Data

Sep. 30, 1999 (JP) .............................. 11-278813

(51) Int. Cl.⁷ ................................ H05B 7/06
(52) U.S. Cl. .......................... 373/88; 373/89
(58) Field of Search ............... 373/88, 89, 97, 373/98, 109, 118; 313/44; 428/408; 106/286.8, 287.27; 501/92, 97.1, 97.2, 97.4; 502/431, 435; 264/105, 122, 125

(56) References Cited

U.S. PATENT DOCUMENTS 4,304,953 A * 12/1981 Machner et al. ............... 373/88
4,351,056 A * 9/1982 Kiikka et al. .................. 373/88
5,912,200 A * 6/1999 Miyake et al. ................. 501/92
5,978,410 A * 11/1999 Johansen et al. ............. 373/89
6,058,133 A * 5/2000 Bowman et al. .............. 373/88

FOREIGN PATENT DOCUMENTS

JP 5-62869 3/1993
JP 8-34628 2/1996

* cited by examiner

Primary Examiner—Tu Ba Hoang
(74) Attorney, Agent, or Firm—Foley & Lardner

(57) ABSTRACT

The invention is to offer such a carbon electrode of less consumption and a long useful life and a method of fabricating the same which prevents particles from falling from carbon electrodes into a melting quartz glass, checks occurrence of bubbles in the quartz glass, and avoids lowering of single crystallizing yield by bubbles existing in a transparent layer formed in the vicinity of an inside surface of a quartz glass crucible when lifting silicon single crystal by using the quartz glass crucible made by using the carbon electrodes. The carbon electrode to be used for melting quartz glass by an arc discharge, is characterized in that an electrode material is composed of carbon of bulk density being 1.80 g/cm³ or higher and a three-point bending strength being 35 MPa or higher.

14 Claims, 3 Drawing Sheets

CARBON ELECTRODE FOR MELTING QUARTZ GLASS AND METHOD OF FABRICATING THEREOF

BACKGROUND OF THE INVENTION

1. Field of the Invention

The present invention relates to a carbon electrode for melting quartz glass and a method of fabricating the same, and in particular to such a carbon electrode for melting quartz enabling to check occurrence of bubbles in the molten quartz glass and a method of fabricating the same.

2. Description of the Related Art

For fabricating quartz glass, for example, a quartz glass crucible for lifting silicon single crystal, an operation has been carried out by using an apparatus 21 for fabricating a quartz glass crucible as shown in FIG. 3. A mold 22 for forming a crucible of a fabricating apparatus 21 is composed of an inside member 23 made of porous carbon capable of reducing pressure and a holder 24 and is rotatably supported by a rotating shaft 25. At an upper part opposite to the inside member 23, there are provided three pieces of carbon electrodes 27 for melting quartz glass by arc discharge.

Accordingly, for fabricating the quartz glass crucible by using the apparatus 21, the rotating shaft 25 is rotated to rotate the crucible forming mold 22 at high speed. Into the mold 22, silica powder of high purity is supplied from the upper part through a supply pipe. The supplied silica powder is forcibly pressed by centrifugal force to the inside member 23 of the crucible forming mold 22, and a formed body 26 of a crucible shape is obtained.

Subsequently, the interior of the inside member 23 is effected by reducing pressure, and the carbon electrodes 27 are electrically conduced to heat the inside of the formed body 26 so as to form a melted layer of quartz glass on an inner surface of the formed body 26.

In the course of melting the quartz glass by the arc discharge and fabricating the quartz glass crucible, carbon particles often fall off from the carbon electrodes 27 into the quartz glass crucible under molten condition. Carbon particles dropping from the carbon electrodes 27 are oxidized and consumed in the quartz glass crucible during melting, and bubbles are generated in the molten quartz glass (transparent layer). In particular, if silicon single crystal is lifted by using the quartz glass crucible having bubbles in the quartz glass, bubbles existing in the transparent layer formed in the vicinity of the inner surface (in particular, the transparent layer) of the quartz glass crucible are expanded into large bubbles, and the bubbles are mixed into the melting silicon concurrently with melting of the transparent layer, and bad influences are given to growth of silicon single crystal and lower single crystallizing yield of silicon single crystal. In addition, the life of carbon electrode is shortened by the consumption of the carbon electrode 27 going with the arc discharge.

Accordingly, it has been demanded to realize such a carbon electrode of less consumption and a long useful life, and a method of fabricating the same which prevents particles from dropping from carbon electrodes into the molten quartz glass, checks occurrence of bubbles in the molten quartz glass, and avoids lowering of a single crystallizing yield by bubbles existing in the transparent layer also when lifting silicon single crystal by means of the quartz glass crucible made by using this carbon electrode.

SUMMARY OF THE INVENTION

The invention has been established in view of the above mentioned circumstances, and it is an object of the invention to provide a carbon electrode of less consumption and a long useful life, and a method of fabricating the same which prevents carbon particles from falling from the carbon electrodes into the liquid molten quartz glass, checks occurrence of bubbles in the quartz glass, and avoids lowering of a single crystallizing yield by bubbles existing in the transparent layer when lifting silicon single crystal by means of the quartz glass crucible made by using this carbon electrode.

A first invention made for accomplishing the above mentioned object is of a subject matter to provide a carbon electrode to be used for melting quartz glass by an arc discharge, characterized in that an electrode base material comprises carbon of bulk density being 1.80 g/cm$^3$ or higher and a three-point bending strength being 35 MPa or higher.

A second invention is of a subject matter characterized in that the electrode base material comprises carbides of a carbonaceous raw material and a binding material, and a maximum particle diameter of the carbon raw material is 150 μm or less, and 90 wt % or more of the carbon raw material has particle diameter of 75 μm or less.

A third invention is of a subject matter characterized in that a secondary particle comprises the above electrode base material composed of the carbonaceous raw material and the binding material, and is an isotropic graphite material combined by carbide of the binding material, a maximum particle diameter of the secondary particle is 500 μm or less, and 50 wt % or more of the secondary particle has particle diameter of 38 to 500 μm.

A fourth invention is of a subject matter characterized in that an anisotropic ratio of specific resistance of the electrode material is 1.1 or less, and an ash content is 5 ppm or less.

A fifth invention is a method of fabricating carbon electrode for melting quartz glass, characterized in that a kneaded material is obtained by heating and kneading the carbonaceous raw material and the binding material, and is pulverized, said carbonaceous raw material having a maximum particle diameter of 150 μm or less, and 90 wt % or more thereof being 75 μm or less of the particle diameter and said binding material having residual carbon of 50% or more, and thereafter the secondary particle is sieved such that the maximum particle diameter is 500 μm or less, and 50 wt % or more is 38 to 500 μm of particle diameter, and is formed into CIP (Cold Isstatic Pressing), followed by, after baking the CIP, processing an isotropic graphite material graphitized at 2900 to 3100° C. and carrying out a purifying process on the CIP.

A sixth invention is a method of fabricating a carbon electrode for melting quartz glass, characterized in that a kneaded material is obtained by heating and kneading the carbonaceous raw material and the binding material and is extruded at 130 to 200° C., said carbonaceous raw material having a maximum particle diameter of 150 μm or less, and 90 wt % or more thereof being 75 μm or less of the particle diameter and said binding material having residual carbon of 50% or more, and the extruded material is baked and processed into a graphite material graphitized at 2900 to 3100° C. and further carried out with a purifying process.

A seventh invention is a method of fabricating carbon electrode for melting quartz glass, characterized in that an isotropic graphite material or a graphite material is impregnated with a thermosetting resin, dried and baked, and then ground on an outer circumference to an extent that the thermosetting resin deposited on a surface is at least removed, and carried out with the above mentioned process.

An eighth invention is a method of fabricating carbon electrode for melting quartz glass, characterized in that a volatile content of the kneaded material is adjusted to be 12 to 15%.

A ninth invention is a method of fabricating carbon electrode for melting quartz glass, characterized in that a carbonaceous raw material is a coal based pitch coke, and a binding material is a coal based tar pitch.

The ash content is measured, by being based on JIS R 7223(1979).

Figure 1:
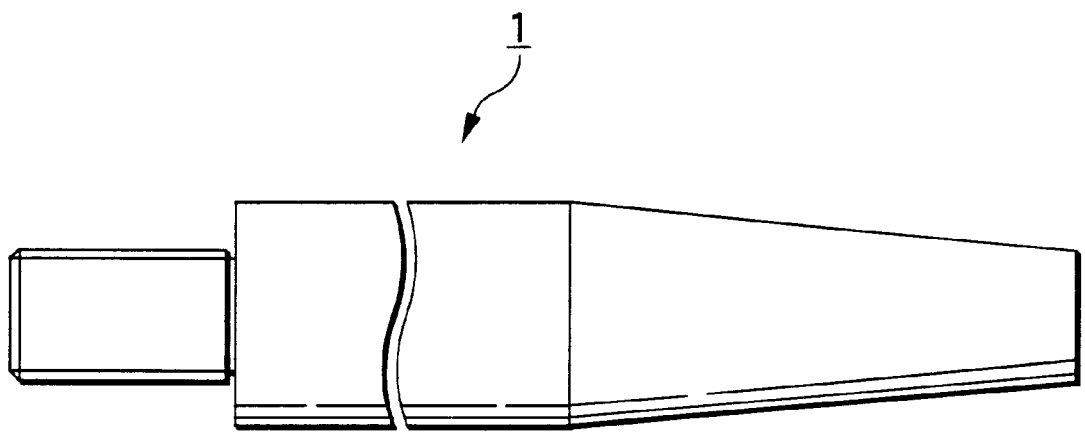
FIG. 1 is side view of a carbon electrode according to the invention.

In the drawings, reference numeral 1 is a carbon electrode, 2 is a quartz glass crucible making apparatus, 3 is a crucible forming mold, 4 is an inside member, 5 is an air part, 6 is a holder, 7 is a rotating shaft, 8 is an opening, 9 is an outlet, 10 is a pressure reduction mechanism, and 11 is a crucible forming body.

DESCRIPTION OF THE PREFERRED EMBODIMENT

Explanation will be made to a first embodiment of the carbon electrode for melting quartz glass according to the invention by way of an example of, in particular, melting a quartz glass crucible for lifting silicon single crystal with reference to the attached drawing.

FIG. 1 is a side view showing the carbon electrode 1 for melting quartz glass, and the carbon electrode 1 is formed as a whole in a tapered column through a later mentioned fabricating method, using raw material of particle coke such as coal based pitch coke, the binding material such as coal tar pitch, and the kneaded material carbonized with coal based coal tar pitch.

In FIG. 1, for preferably restraining carbon particle from dropping off, the front end part of the carbon electrode 1 is semispherical, in short, arc shaped in cross section, but not limited thereto, and a rectangular cross section is sufficient.

The carbon electrode comprises carbon of bulk or apparent density being 1.80 g/cm$^3$ or more and a three-point bending strength being 35 MPa or more.

The bulk density designates a carbon content per unit volume, and the higher the density, the less the consumption and dropping of the carbon electrode, and preferable is 1.80 g/cm$^3$ or more. If being less than 1.80 g/cm$^3$, the consumption and drop of the particle occur to very often generate their bubbles in the liquid quartz glass, for example, if silicon single crystal is lifted by using the quartz glass crucible having bubbles in the quartz glass, bubbles existing in the transparent layer formed in the vicinity of the inner surface (in particular, the transparent layer) of the quartz glass crucible are expanded into large bubbles, and the bubbles are mixed into the molten silicon concurrently with melting of the transparent layer, and bad influences are given to growth of silicon single crystal and lower single crystallizing yield of silicon single crystal.

The three-point bending strength is concerned with strength of combination of particles one another, and the higher the three-point bending strength, the less the consumption and the particles dropping down. From the two elements of the bulk density and the three-point strength, a determination is made concerning easy occurrence of the consumption of the quartz glass when melting and easy dropping of particles, and if providing conditions of the bulk density being 1.80 g/cm$^3$ or more and the three-point strength being 35 MPa or more, the above mentioned effects are heightened.

The carbon electrode 1 is composed of carbides of the carbonaceous raw material and the binding material, and it is preferable that the maximum particle diameter of the carbon raw material is 150 μm or less, and 90 wt % or more of the carbon raw material has particle diameter of 75 μm or less.

The maximum particle diameter of the carbon raw material is determined in that when particles fall off from the carbon electrodes during using them and whether the particles are oxidized and consumed until dropping toward and reaching the molten quartz glass. When the maximum particle diameter of the carbon raw material is 150 μm or less, and 90 wt % or more of the carbon raw material has particle diameter of 75 μm or less, the dropping particles are hard to reach the molten quartz glass, and completely oxidized and consumed, otherwise if dropping to the quartz glass, diameters of the dropping particles are very small and scarcely cause the quartz glass to generate bubbles.

If the maximum diameter of the carbon raw material is 150 μm or larger, otherwise if the particles of the particle diameter exceeding 75 μm exist 10 wt % or more, the dropping particles are not oxidized or consumed but drop into the molten quartz glass and are covered with the molten quartz glass to more possibly cause bubbles.

The particle diameter of the carbon raw material can be confirmed by observing composition of the carbon electrode through a polarization microscope.

More preferably, the carbon electrode 1 is that the secondary particle composed of carbides of the carbonaceous raw material and the binding material is the isotropic graphite material combined by the carbide of the binding material, the maximum particle diameter of the secondary particle is 500 μm or less, and 50 wt % or more of the secondary particle has the particle diameter of 38 to 500 μm.

If the carbon electrode 1 is composed of the isotropic graphite material as mentioned above, the structure thereof can be made more uniform enabling to decrease dropping of the particles. A reason why the maximum diameter of the secondary particle of the isotropic graphite material is determined to be 500 μm or less, is because when particles fall down from the carbon electrodes during using them, they are oxidized and consumed until dropping toward and reaching the molten quarts glass. If being 500 μm or larger, the dropping particles are not oxidized or consumed but drop into the quartz glass and are covered with the molten quartz glass to easily cause bubbles.

A reason why the maximum diameter of the secondary particle is allowed to be larger than the maximum particle diameter of the primary particle which is a raw material of the secondary particle, is because the secondary particle is kneaded with the primary particle as the raw material of the secondary particle to fabricate the binding material, dried and pulverized, in short, because the primary particle is combined with carbon content (dried content) of the binding material, and the carbon content is far easy to be oxidized and consumed than the primary particle.

A reason why 50 wt % or more of the secondary particle is 38 to 500 μm, is because if particles of diameter being less than 38 μm are contained exceedingly 50 wt %, though degree of dropping particles is certainly lowered, the consumption of the carbon electrode is fast when melting the quartz glass, and a useful life trends to become short.

Preferably, the carbon electrode 1 is that the anisotropic ratio of specific resistance is 1.1 or less, and the ash content thereof is 5 ppm or less.

The anisotropic ratio of specific resistance is assumed to be a factor designating uniformity of the structure of the carbon electrode 1, and a reason why the anisotropic ratio is determined to be 1.1 or less, is because for maintaining the uniformity of the structure and preventing particles from falling down, and if exceeding 1.1, particles easily fall down, and when lifting single crystal, such particles cause foreigners to drop to the inside surface of the quarts glass crucible and bubbles to occur at mixing. The specific resistance at this time is 1000 to 1250 μΩ-cm. The anisotropic ratio of extruded articles by the extrusion formation, not by the IP formation is 1.6 to 2.0.

A reason why the ash content is 5 ppm or less, is because for reducing the consumption of the carbon electrode 1. When impurities are much in the carbon electrode 1, local consumption of the carbon electrode 1 is fast, and if the ash content exceeds 5 ppm, the uniformity in consumption is lost, and since the carbon electrode is selectively consumed, large lumps where a plurality of particles are combined drop to cause bubbles to occur in the quartz glass crucible.

Further explanation will be made to embodiments of a fabricating method of the carbon electrode for melting quartz glass.

The kneaded material is obtained by heating and kneading a carbonaceous raw material and a binding material and is pulverized, said carbonaceous raw material having a maximum particle diameter of 150 μm or less, and 90 wt % or more thereof being 75 μm or less in the particle diameter and said binding material having residual carbon of 50% or more, and thereafter the secondary particle is sieved such that a maximum particle diameter is 500 μm or less, and 50 wt % or more is 38 to 500 μm in particle diameter, and is formed into a CIP, followed by, after baking the CIP, processing an isotropic graphite material graphitized at 2900 to 3100° C. and carrying out a purifying process.

If the carbon residual content of the binding material is less than 50%, the binding faculty of the carbonaceous raw material is inferior, and in particular the three-point strength of 35 MPa or more is difficult to obtain.

A reason for using the CIP formation is because the CIP formation is possible to pulverize the kneaded material of the raw material and the combined material, easy to regulate the secondary particle, and is suited to the fabrication of the isotropic graphite material.

A reason for graphitizing the baked and formed body at 2900 to 3100° C. is because the temperature of less than 2900° C. is insufficient for graphitization, and the uniformity of the carbon electrode is not enough. The graphitization at temperature of exceeding 3100° C. is poor in industrial application.

The ash content can be 5% or lower by purifying the baked body.

A second embodiment of the method of fabricating the carbon electrode for melting quartz glass of the invention will be referred to.

A kneaded material is obtained by heating and kneading the carbonaceous raw material and the binding material and is extruded at 130 to 200° C., said carbonaceous raw material having a maximum particle diameter of 150 μm or less, and 90 wt % or more thereof being 75 μm or less in the particle diameter and said binding material having a residual carbon content of 50% or more, and the extruded material is baked and processed into a graphite material graphitized at 2900 to 3100° C. and further carried out with a purifying process thereon.

A reason why the extrusion formation is carried out at 130 to 200° C., is because if temperature of less than 130° C. is not preferable since it is hard to provide fluidity of the kneaded material necessary for the extrusion formation, and if exceeding 200° C., it is difficult to appropriately adjust a volatile content of the formed body prior to baking, so that the high bulk density and the three-point strength are not easily available.

The isotropic graphite material obtained in the first embodied fabrication method or the graphite material obtained in the second embodied fabrication method are each 10% in porosity, and pores are impregnated with thermosetting resin such as phenol based or furan based resin, then baked in an oven with the heat source of a heavy burner similarly to the above baking, processed to form, and carried out with high purity process to form the carbon electrode by reducing the ash content below 5 ppm.

By impregnating the thermosetting resin in the formed body, neck portions of particles are strengthened one another, so that the consumption degree when using is lessened, and dropping of carbon particles is reduced. A reason for using phenol or furan based resin as the thermosetting resin is because oxidation is less, the consumption and dropping may be controlled, bubbles are hard to occur in the liquid quartz glass, and yield of single crystallization of silicon single crystal can be heightened.

By adjusting the volatile content to be 12 to 15%, it is easy to provide the bulk density of 1.80 g/cm$^3$ or higher and the three-point bending strength of 35 MPa or higher, so that the graphite material of higher uniformity may be obtained.

If combining the carbonaceous raw material with coal based pitch coke, and the combining material with coal based coal tar pitch, the consumption of the carbon electrode when melting the quartz glass can be more reduced.

Still further explanation will be made to the fabrication method of the quartz glass crucible using the carbon electrode of the invention for melting quartz glass.

Figure 2:
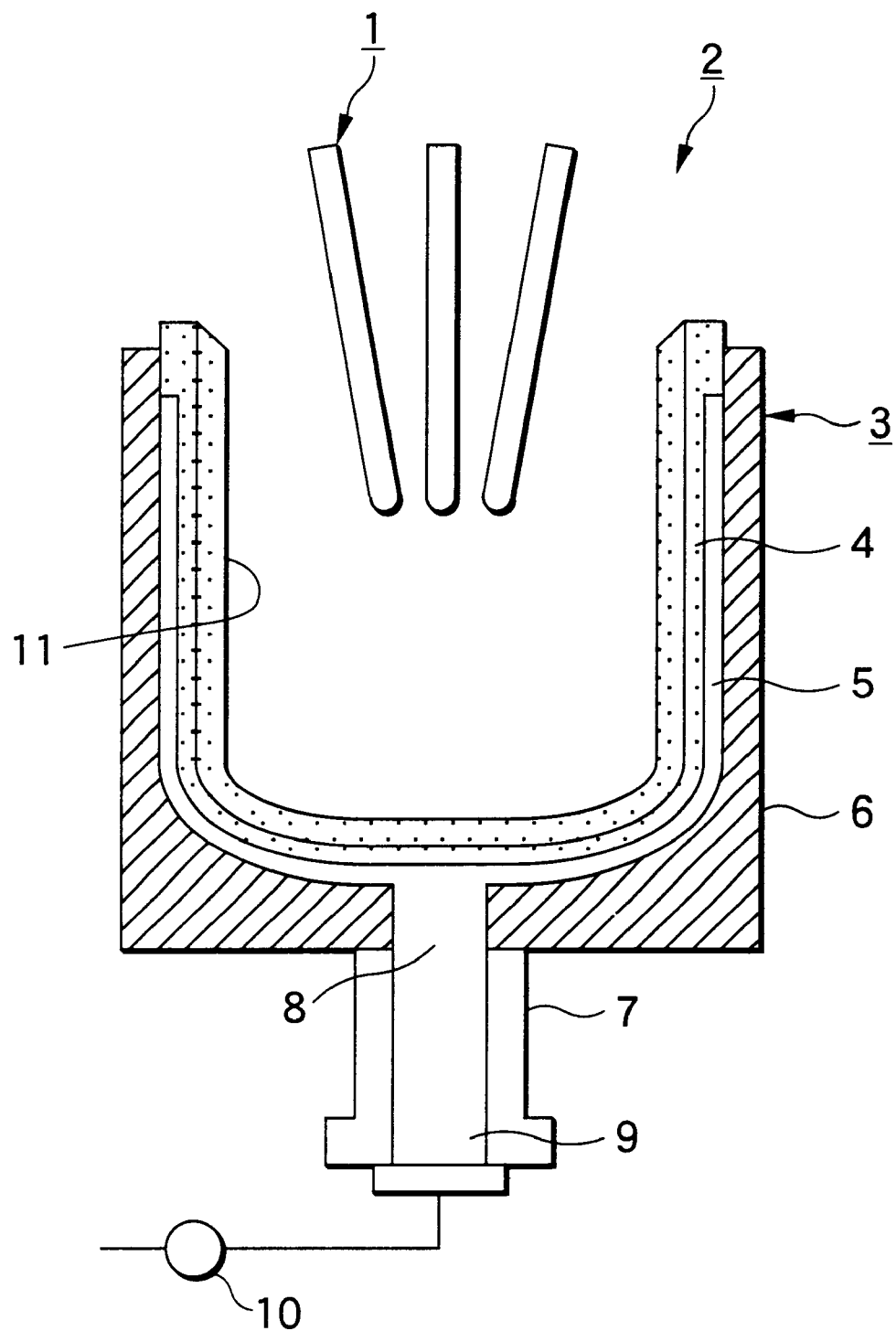
FIG. 2 is an explanatory view of a quartz glass crucible making apparatus incorporated with the carbon electrodes of the invention.
Figure 3:
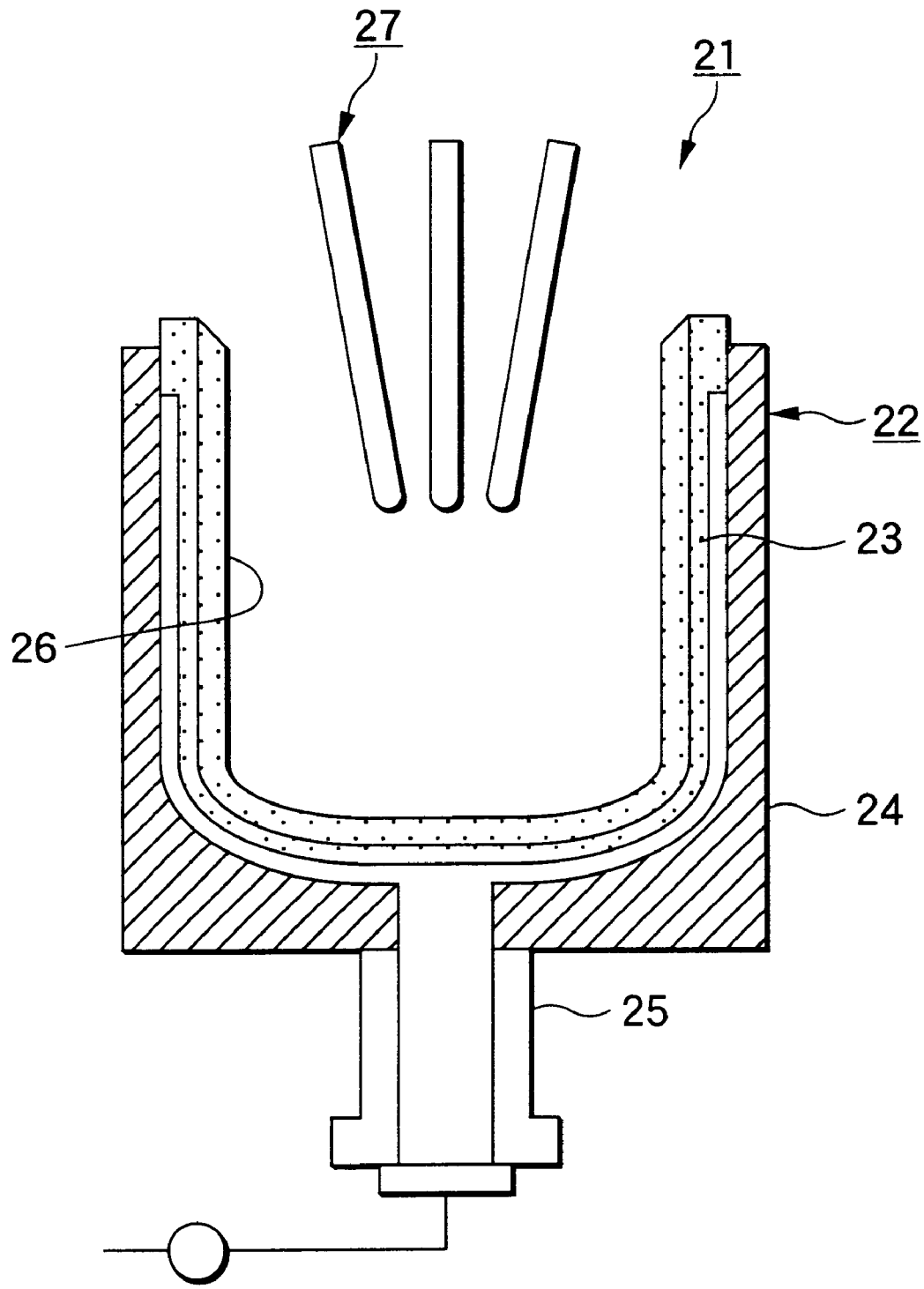
FIG. 3 is an explanatory view of a quartz glass crucible making apparatus incorporated with the prior art carbon electrodes.

As shown in FIG. 2, a crucible forming mold 3 of the apparatus 2 for fabricating the quartz glass crucible comprises an inside member 4 composed of porous carbon mold carried out with treatment of high purification, an air part 5 at the outer circumference of the inside member 4, and a holder 6 for holding the inside member 4. At the lower part of the holder 6, there is secured a rotating shaft 7 connected with a rotating means (not shown), rotatably supporting the crucible forming mold 3. The air part 5 is communicated with an outlet 9 formed centrally in the rotating shaft 7, the outlet 9 being communicated with a pressure reduction mechanism 10.

At an upper part opposite to the inside member 4, there are provided three pieces of carbon electrodes 1 for melting quartz glass by arc discharge.

Accordingly, for fabricating the quartz glass crucible by using the apparatus 2, the rotating shaft 7 is rotated by working a driving source (not shown) to rotate the crucible forming mold 3 at high speed. Into the mold 3, silica powder of high purity is supplied from an upper part through a supply pipe (not shown). The supplied silica powder is forcibly pressed by centrifugal force to the inside member 4 of the crucible forming mold 3, and a crucible shape is obtained as a formed body 11.

Further, the interior of the inside member 4 is effected by a pressure reduction mechanism 10, and the carbon electrodes 1 are electrically conduced to heat the inside of the crucible forming body 11 by the arc discharge so as to form a melted layer on an inside surface of the formed body 11.

In the course of melting the quartz glass by the arc discharge and fabricating the quartz glass crucible, since the bulk density of the carbon electrode is 1.80 g/cm$^3$ or higher and the three-point bending strength is 35 MPa or higher, the carbon electrode is less consumed and dropped, and bubbles exist very little in the transparent layer on the inside surface of the quartz glass crucible. Accordingly, if nomocrystal is lifted by using the quartz glass crucible, there do not occur such matters that bubbles existing in the transparent layer are expanded into large bubbles and the bubbles are mixed into the molten silicon together with melting of the transparent layer, and bad influences are given to growth of silicon single crystal. Thus, the single crystallizing yield of silicon single crystal is increased.

Since the maximum particle diameter of the raw material in particles of the carbon electrode 1 is 150 μm or less, and 90 wt % thereof is particle diameter being 75 μm or less, dropping carbon particles are hard to reach the quartz glass and are completely oxidized and consumed on the way thereto, otherwise even if particles drop to the molten quartz glass, the diameter of the dropping particle is at this time very small to less cause bubbles in the molten quarts glass, so that the yield of nomocrystallization of silicon nomocrystal is increased.

The maximum diameter of the secondary particle is 500 μm or less, and 50 wt % or more thereof has the particle diameter of 38 to 500 μm, so that the consumption rate of the carbon electrode 1 is delayed to lengthen the useful life, and since particles dropping toward the molten quartz glass are oxidized and consumed until reaching it, they are not involved into the quartz glass nor cause bubbles therein.

The electrode basic material has the anisotropic ratio of specific resistance being 1.1 or less, the structure is maintained uniform, carbon particles are prevented from dropping toward the liquid quartz glass, and bubbles are not formed therein.

Since the ash content in the electrode base material is 5 ppm or less, the uniformity of consumption is kept, so that there is not such a matter that large lumps where a plurality of particles are combined drop to cause bubbles to occur in the quartz glass crucible.

As the electrode basic material has the anisotropic ratio of specific resistance being 1.1 or less, the structure is maintained uniform, particles are prevented from falling from the carbon electrode while making the quartz glass crucible, thereby to make bubbles hard to occur in the quartz glass, so that the yielding of nomocrystallization of silicon nomocrystal is increased.

The formed body is impregnated with the thermosetting resin, and neck portions of particles are strengthened one another, so that the consumption degree when using is lessened, carbon particles are prevented from dropping toward the liquid quartz glass, bubbles are hard to occur in the liquid quartz glass, and the yield of single crystallization of silicon single crystal can be heightened.

EXAMPLES

Examples 1, 2, 3 and Comparative Examples 1, 2, 3

The kneaded material where the coal based pitch coke and the coal based coal tar pitch (binding material) were heated and dried, was pulverized, said coal based pitch coke being the carbonaceous raw material (primary particle) having sizes as shown in Table 1 and said coal based coal tar pitch having the residual carbon content being 55%. The pulverized material was sieved as Table 1 to be the secondary particles, and the secondary particles were formed into CIP. The CIP formed body was baked in the oven having the heat source of a heavy oil burner, then graphitized at 3000° C., processed as shown in FIG. 1, and purified at 2000° C. or higher in the oven of halogen gas flowing to fabricate the carbon electrodes of the ash content being 1 ppm.

At this time, by changing the pressure for forming the CIP and the baking temperature and time, the carbon electrodes of different bulk densities and three-point bending strengths as shown in Table 1 were obtained (Examples 1, 2, 3 and Comparative Examples 1, 2, 3).

Each of Examples and each of Comparative Examples were incorporated as the carbon electrodes in the apparatus for making the quartz glass crucible by an arc rotation melting method so as to fabricate the quartz glass crucibles to be used to an apparatus of lifting silicon nomocrystal by a CZ method, and results of evaluating the carbon electrodes and the quartz glass crucibles are shown in Table 1.

The three pieces of the carbon electrodes were made one set per each of Examples and each of Comparative Examples, and four quartz glass crucibles of 22 inch caliber were made in one set. Thus, 20 pieces of quartz glass crucibles were made per the carbon electrodes of each Example having the five sets and each Comparative Example having the same.

As a result, by adjusting the bulk density of the electrode base material to be 1.8 g/Cm$^3$ or higher and the three-point strength to be 35 MPa or higher in the carbon electrode for melting the quartz glass by the arc discharge, it was found that the consumption of the carbon electrodes was low, and greatly reduced were bubbles of diameter being less than and more than 1.0 mm in the inner surfaces of the quartz glass crucibles accompanying drop of the carbon particles from the carbon electrodes.

Further, when making silicon single crystal ingots for 8 inch silicon wafer, using the quartz glass crucibles of Example 2 and Comparative Example 1, it was confirmed that the difference in significance was apparent as the yield of single crystallization (DF rate) was 97% in Example 2 and 92% in Comparative Example 1.

Example 4

The carbon electrodes were fabricated and evaluated in the same way as Example 3, excepting that the maximum particle diameter of the carbonaceous raw material (primary particle) was 190 μm, and with respect to the particle distribution, the particle size [75 μm or smaller]: [larger than 75 μm to 150 μm or smaller]=85:15.

Results of the above are shown in Table 1. The consumption of the carbon electrode was almost equal to the case of Example 3, but the number of fine bubbles of diameter being less than 1.0 mm on the inside surface of the quartz glass crucible was increased about three times of Example 3, and one or two of bubbles of diameter being 1.0 mm or larger were confirmed in the 20 quartz glass crucibles. But comparing with Comparative Examples 1 to 3, both consumption and bubble number had low values.

It may be assumed that when the carbonaceous raw material (primary particle) exceeds a predetermined value, carbon particles dropping from the carbon electrodes are not burnt completely, drop to the inside surface within the quartz glass crucible, and become out bubbles.

Example 5

The carbon electrodes were fabricated and evaluated in the same way as Example 3, excepting that the maximum particle diameter of the carbonaceous raw material (primary particle) was 235 μm, and with respect to the particle distribution, the particle size [75 μm or smaller]: [larger than 75 μm to 150 μm or smaller]=85:15, and they were kneaded to fabricate the secondary particles having the maximum particle diameter of 600 μm. Results thereof are shown in Table 1.

The consumption of the carbon electrode was almost equal to the cases of Examples 3 and 4, but the number of fine bubbles of diameter being less than 1.0 mm on the inside surface of the quartz glass crucible was increased about six times of Example 3 and about twice of Example 4, and bubbles of diameter being 1.0 mm or larger were confirmed about twice of Example 4. But comparing with Comparative Examples 1 to 3, consumption was reduced about 30% and bubble number was about 1/5.

With respect to increase of bubble number comparing with Examples 3 and 4, it may be assumed that the maximum diameter of the primary particle and the diameter of the secondary particle are increased, and carbon particles drop on the inside surface of the quartz glass and become bubbles.

Example 6

The maximum particle diameter of the carbonaceous raw material (primary particle) was 100 μm, and with respect to the particle distribution, [75 μm or smaller]: [larger than 75 μm to 150 μm or smaller]=95:5, and with respect to the particle distribution, [38 μm or smaller]: [larger than 38 μm]=60:40, the carbon electrodes were fabricated and evaluated in the same way as Example 3. Results thereof are shown in Table 1.

The consumption of the carbon electrode was increased about 20% of Example 3, but the number of fine bubbles of diameter being less than 1.0 mm, and 1.0 mm or larger were equal on the inside surface of the quartz glass crucible, and it was confirmed that they were small.

It may be assumed that the secondary particles of diameter being 38 μm or less existed exceedingly 50 wt %, and if they were fine as a whole, though particles dropped almost at the same degree as Example 3, the combustion amount on the electrode surface was large when the arc discharged, and the consumption of the carbon electrode was relatively large.

Example 7

The carbon electrodes were fabricated and evaluated in the same way as Example 1, excepting that the carbonaceous raw material (primary particle) was a petroleum based coke.

Results of the above are shown in Table 1.

With respect to the consuming length of the carbon electrodes and the bubble number on the inside surface of the quartz glass crucible, each of them was better than Comparative Examples 1 to 3, but somewhat inferior to Example 1.

From the above, it was found that as the carbonaceous raw material, the coal based pitch coke was more preferable than the petroleum based coke.

Examples 8, 9 and Comparative Examples 4 to 6

The kneaded material was obtained by heating and kneading the coal based pitch coke (Example 8) or the petroleum based coke (Example 9 and Comparative Examples 4 to 6) as the carbonaceous raw material (primary particle) having the diameter of Table 1 and the coal based coal tar pitch (binding material) having the residual coal of 55%, and was extruded at 160° C. to form a body, and the formed body was baked in the oven with the heat source of the heavy burner, graphitized at 3000° C., processed as shown in FIG. 1, and purified at 2000° C. or higher in the oven of halogen gas flowing to fabricate the carbon electrodes of the ash content being 1 ppm.

At this time, by changing the pressure when extruding and the baking temperature and time, the carbon electrodes of different bulk densities and three-point bending strengths as shown in Table 1 were obtained.

With respect to the above carbon electrodes, the same evaluations as Example 1 were made, and results are shown in Table 1.

As a result, by adjusting the bulk density of the electrode base material to be 1.80 g/cm$^3$ or higher and the three-point strength to be 35 MPa or higher in the carbon electrode for melting the quartz glass by the arc discharge, it was found that the consumption of the carbon electrodes was low. Greatly reduced were bubbles of diameter being less than and more than 1.0 mm in the inner surfaces of the quartz glass crucibles accompanying drop of the carbon particles from the carbon electrodes.

When carrying out the extruding formation, as relatively large carbon particles drop from the carbon electrodes, it is assumed that somewhat inferior results are available in comparison with the CIP formation, since it is difficult to regulate the size of the secondary particle.

Example 10

The graphitized body fabricated in the same way as Example 1 was made a base material, where P-toluene sulfonic acid was added as a catalyst to furfuryl alcohol, and it was immersed in a liquid polymerized until viscosity of 4000 cp, and impregnated. Then it was baked at 1000° C., and processed into the electrode shape as shown in FIG. 1 to fabricate the carbon electrode by removing surplus impregnated material deposited on the outer periphery of the electrode. Thereafter, the samples were obtained by passing the halogen based gas at 2000° C. or higher, performing the high purity treatment and adjusting the ash content 3 ppm or lower.

With respect to the samples, the same evaluations as Example 1 were made, and results are shown in Table 1.

In Example 10, in comparison with Example 1, the consumption is smaller, and the occurrence of bubbles in the quartz glass crucible is reduced. This is assumed that if impregnating the thermosetting resin, the neck portions of particles one another are strengthened.

Table 1 shows characteristics of the samples used the Examples and the test results.

TABLE 1

| | Kinds of raw materials | Mold-ing | Maximum grain diameter of primary grain (μm) | Primary grain Less than 75μ:More than 75μ (wt % ratio) | Maximum grain diameter of secondary grain (μm) | Secondary grain Less than 38μ:38μ or larger (wt % ratio) | Bulk density (g/cm³) | Three-point bending strength (MPa) | (*1) Consumption length of carbon electrode (mm/set) | (*2) Diameter of 20 pieces of crucibles Number of bubbles of less than 1.0 mm (Number) | (*3) Diameter of 20 pieces of crucibles Number of bubbles of 1.0 mm or larger (Number) |
|---|---|---|---|---|---|---|---|---|---|---|---|
| Comparative example 1 | Coal family | CIP | 100 | 95:5 | 200 | 40:60 | 1.75 | 30 | 358 | 1792 | 162 |
| Comparative example 2 | Coal family | CIP | 100 | 95:5 | 200 | 40:60 | 1.80 | 30 | 350 | 1787 | 159 |
| Comparative example 3 | Coal family | CIP | 100 | 95:5 | 200 | 40:60 | 1.75 | 35 | 334 | 1600 | 153 |
| Example 1 | Coal family | CIP | 100 | 95:5 | 200 | 40:60 | 1.80 | 35 | 218 | 54 | 0 |
| Example 2 | Coal family | CIP | 100 | 95:5 | 200 | 40:60 | 1.85 | 40 | 203 | 48 | 0 |
| Example 3 | Coal family | CIP | 150 | 95:5 | 500 | 35:65 | 1.85 | 40 | 223 | 67 | 0 |
| Example 4 | Coal family | CIP | 190 | 85:15 | 500 | 35:65 | 1.85 | 40 | 232 | 201 | 19 |
| Example 5 | Coal family | CIP | 235 | 85:15 | 600 | 35:65 | 1.80 | 35 | 254 | 442 | 33 |
| Example 6 | Coal family | CIP | 100 | 95:5 | 150 | 60:40 | 1.85 | 40 | 261 | 72 | 1 |
| Example 7 | Petroleum family | CIP | 100 | 95:5 | 200 | 40:60 | 1.80 | 40 | 279 | 133 | 4 |
| Example 8 | Coal family | Extrusion | 100 | 95:5 | — | — | 1.80 | 35 | 272 | 508 | 42 |
| Example 9 | Petroleum family | Extrusion | 100 | 95:5 | — | — | 1.80 | 35 | 291 | 589 | 48 |
| Comparative Example 4 | Petroleum family | Extrusion | 100 | 95:5 | — | — | 1.65 | 25 | 491 | 2735 | 375 |
| Comparative example 5 | Petroleum family | Extrusion | 100 | 95:5 | — | — | 1.80 | 30 | 401 | 2140 | 214 |
| Comparative example 6 | Petroleum family | Extrusion | 100 | 95:5 | — | — | 1.75 | 40 | 409 | 1943 | 169 |
| Example 10 | Coal family | CIP | 100 | 95:5 | 200 | 40:60 | 1.81 | 37 | 180 | 24 | 0 |

(*1), (*2), (*3) in Table 1 are as follows.
(*1) Consumed length: The four quartz glass crucibles per one set were fabricated, thereafter the consumed length was measured, and the average values of five sets were described.

Consumed length=original length−length of electrodes after making four crucibles (*2) 0.5 mm bubbles: The number of bubbles exceeding 0.5 mm diameter in products per 20 quartz glass crucibles. Total in the number of occurring bubbles of 4 pieces/1 set×5 sets=20 pieces.
(*3) Of bubbles of 0.5 mm diameter of 20 pieces of the quartz glass crucible, the number of bubbles exceeding 0 mm. Total in the number of occurring bubbles of 4 pieces/1 set×5 sets=20 pieces.

According to the carbon electrode for smelting quartz glass and the fabrication method thereof concerned with the invention, it is possible to offer the carbon electrode to be less consumed and having the long useful life by preventing drop of carbon particles from the used carbon electrodes to the molten quartz glass, avoiding occurrence of bubbles in the molten quartz glass, and when lifting silicon single crystal by means of the quartz glass crucible made by using the carbon electrodes, keeping the single crystallizing yield from lowering.

Namely, since the base material of the carbon electrode for melting quartz glass comprises such carbon having the bulk density of 1.80 g/cm³ or higher, and the three-point bending strength of 35 MPa or higher, so that the consumption of the carbon electrode and the drop of carbon particle can be effectively suppressed.

The electrode base material is composed of carbides of the carbonaceous raw material and the binding material, the maximum particle size of the carbon raw material is 150 μm or less, and 90 wt % or more of the carbon raw material has the diameter of 75 μm or less, so that the dropping particles are hard to reach the melting quartz glass and are completely oxidized and consumed on the way thereto, otherwise even if particles drop to the molten quartz glass, the diameter of the dropping particle is very small at this time to less cause bubbles in the molten quarts glass, so that the yield of nomocrystallization of silicon nomocrystal is increased.

With respect to the electrode base material, the secondary particle composed of carbides of the carbonaceous raw material and the binding material is the isotropic graphite material combined by the carbide of the binding material, and the maximum diameter of the secondary particle is 500 μm or less, and 50 wt % or more of the secondary particle has the diameter of 38 to 500 μm, so that the consumption rate of the carbon electrode is delayed and the useful life is lengthened, and further since the dropping carbon particles are oxidized and consumed until reaching the quartz glass during melting, they are not involved in the liquid molten quartz glass, not causing bubbles therein.

The basic material of the electrode has the anisotropic ratio of specific resistance being 1.1 or less, the ash content is 5 ppm or less, the structure is maintained uniform, particles are prevented from dropping toward the liquid quartz glass, and bubbles are not formed therein.

The kneaded material is obtained by heating and kneading the carbonaceous raw material and the binding material and is pulverized, said carbonaceous raw material having the maximum particle diameter of 150 μm or less, and 90 wt % or more thereof being 75 μm or less in the particle diameter and said binding material having residual carbon of 50% or more, and thereafter the secondary particle is sieved such that a maximum particle diameter is 500 μm or less, and 50 wt % or more is 38 to 500 μm in particle diameter, and is formed into the CIP, followed by, after baking the CIP, processing the isotropic graphite material graphitized at 2900 to 3100° C. and carrying out a purifying process thereon. Thus, it is possible to offer the carbon electrode to be less consumed and having the long useful life by preventing drop of carbon particles from the used carbon electrodes to the molten quartz glass, avoiding occurrence of bubbles in the molten quartz glass, and when lifting silicon single crystal by means of the quartz glass crucible made by using the carbon electrodes, keeping the single crystallizing yield from lowering.

The kneaded material is obtained by heating and kneading the carbonaceous raw material and the binding material and is pulverized, said carbonaceous raw material having the maximum particle diameter of 150 μm or less, and 90 wt % or more thereof being 75 μm or less in the particle diameter and said binding material having residual carbon of 50% or more. The kneaded material is extruded at 130 to 200° C., and processed, after baking, into the graphite material graphitized at 2900 to 3100° C. and further carried out with a purifying process, and therefore it is possible to adjust each of the bulk density being 1.80 g/cm$^3$ or higher and the three-point bending strength being 35 MPa or higher, and to fabricate the carbon electrode of less consumption and large reduction of bubbles by dropping of carbon particles from the electrode.

The carbon electrode for melting quartz glass is fabricated by impregnating the thermosetting resin in the isotropic graphite material or the graphite material, drying, baking, grinding the outer periphery to an extent of removing the thermosetting resin deposited on the surface, and processing, so that neck portions of particles are strengthened one another, hard to be oxidized, and small in the consuming degree while using, and the drop of carbon particles from the electrode is reduced, bubbles are scare to generate, and thus the single crystallizing yield of silicon single crystal can be increased.

Further, the volatile content of the kneaded material is adjusted to be 12 to 15%, so that it is easy to obtain the bulk density of 1.80 g/cm$^3$ or higher and the three-point bending strength of 35 MPa or higher, and the more uniform graphite material is available.

The carbonaceous raw material is the coal based pitch coke, and the binding material is the coal based coke tar pitch, and therefore the carbon electrode can be less consumed while melting quartz glass.

What is claimed is:

1. A carbon electrode to be used for melting quartz glass by an arc discharge, wherein an electrode base material comprises carbon of bulk density being 1.80 g/cm$^3$ or higher and three-point bending strength being 35 MPa or higher.

2. The carbon electrode to be used for melting quartz glass as set forth in claim 1, wherein the electrode base material comprises carbides of a carbonaceous raw material and a binding material, and a maximum particle diameter of the carbonaceous raw material is 150 μm or less, and 90 wt % or more of the carbonaceous raw material has particle diameter of 75 μm or less.

3. The carbon electrode to be used for melting quartz glass as set forth in claim 2, wherein said electrode base material is constituted by a secondary particle composed of the carbonaceous raw material and carbide of the binding material, a maximum particle diameter of the secondary particle is 500 μm or less, and 50 wt % or more of the secondary particle has particle diameter of 38 to 500 μm.

4. The carbon electrode to be used for melting quartz glass as set forth in claim 1, wherein an anisotropic ratio of specific resistance of the electrode base material is 1.1 or less, and an ash content is 5 ppm or less.

5. The carbon electrode to be used for melting quartz glass as set forth in claim 1, wherein the front end part of the carbon electrode is semispherical.

6. The carbon electrode to be used for melting quartz glass as set forth in claim 1, wherein specific resistance of the carbon electrode is in a range of 1000 to 1250 μΩ-cm.

7. The carbon electrode to be used for melting quartz glass as set forth in claim 1, wherein the carbon electrode is equal to or lower than 10% in porosity.

8. A method of fabricating a carbon electrode for melting quartz glass, wherein a kneaded material is obtained by heating and kneading a carbonaceous raw material and a binding material, and is pulverized, said carbonaceous raw material having a maximum particle diameter of 150 μm or less, and 90 wt % or more thereof being 75 μm or less of the particle diameter and said binding material having residual carbon of 50% or more, and thereafter a secondary particle is sieved such that the maximum particle diameter is 500 μm or less, and 50 wt % or more is 38 to 500 μm of the particle diameter, and pressing said secondary particle by cold isostatic pressing, followed by, after baking said pressed secondary particle, processing an isotropic graphite material graphitized at 2900 to 3100° C. and carrying out a purifying process on said isotropic graphite material.

9. A method of fabricating carbon electrode for melting quartz glass as set forth in claim 8, wherein said purifying process is a heating process at 2000° C. or higher in the oven of halogen gas.

10. A method of fabricating carbon electrode for melting quartz glass, wherein a kneaded material is obtained by heating and kneading the carbonaceous raw material and the binding material, and is extruded at 130 to 200° C., said carbonaceous raw material having a maximum particle diameter of 150 μm or less, and 90 wt % or more thereof being 75 μm or less of the particle diameter and said binding material having residual carbon of 50% or more, and the extruded material is baked and processed into a graphite material graphitized at 2900 to 3100° C. and further carried out with a purifying process.

11. A method of fabricating carbon electrode for melting quartz glass as set forth in claim 10, wherein said purifying process is a heating process at 2000° C. or higher in the oven of halogen gas.

12. The method of fabricating carbon electrode for melting quartz glass as set forth in claim 8, wherein the isotropic graphite material or the graphite material is impregnated with a thermosetting resin, dried and baked, and then ground on an outer circumference to an extent that the thermosetting resin deposited on a surface is at least removed, and carried out before said purifying process.

13. The method of fabricating carbon electrode for melting quartz glass as set forth in a claim 8, wherein a volatile compound of the kneaded material is adjusted to be 12 to 15%.

14. The method of fabricating carbon electrode for melting quartz glass as set forth in claim 8, wherein the carbonaceous raw material is a coal based pitch coke, and the binding material is a coal tar pitch.

* * * * *